FIG. I

United States Patent Office 3,579,294
Patented May 18, 1971

3,579,294
PROCESS FOR EXTRACTION OF ALUMINA FROM ORES BY SOLUTION OF CAUSTIC SODA AND SODIUM ALUMINATE
Louis Tamisé, Douvres-la-Delivrande, and Jacques Millet, Versailles, France, assignors to Pechiney-Compagnie de Produits Chimiques et Electrometallurgiques, Paris, and Societe Appareils et Evaporateurs Kestner, Lille, France
Filed Mar. 15, 1968, Ser. No. 713,421
Claims priority, application France, Mar. 20, 1967, 99,393
Int. Cl. C01f 7/02
U.S. Cl. 23—52                                     10 Claims

ABSTRACT OF THE DISCLOSURE

Process and equipment for the continuous extraction of alumina from bauxite by dissolution in aqueous caustic soda and sodium aluminate solutions in which use is made of a plurality of autoclaves of increasing temperature through which the suspension flows in series from one to the next in a sequence of stages and a plurality of expansion vessels of decreasing pressure in series with the autoclaves and through which the suspension flows in series.

---

This invention relates to the continuous treatment of bauxite with an aqueous solution of caustic soda and sodium aluminate for the recovery of aluminum oxide and it relates more particularly to a method and apparatus for the practice of same.

Installations for the continuous attack on bauxite with caustic soda are generally based on the same principle, with certain modifications, due primarily to the nature of the bauxite being treated, since some bauxites are more easily attacked than others, depending somewhat upon the type of ore being worked.

It is an object of this invention to provide a new and improved method and apparatus for the extraction of alumina from ores containing alumina, such as bauxite, in which the process can be carried out in a continuous operation, in which the process can be carried out with less encrustation of the walls of the heat exchangers thereby to provide for more efficient heat exchange and whereby the process can be carried out in a more continuous and efficient operation.

These and other objects and advantages of this invention will hereinafter appear and for purposes of illustration, but not of limitation, embodiments of the invention are illustrated in the accompanying drawings in which—

Figure 1:
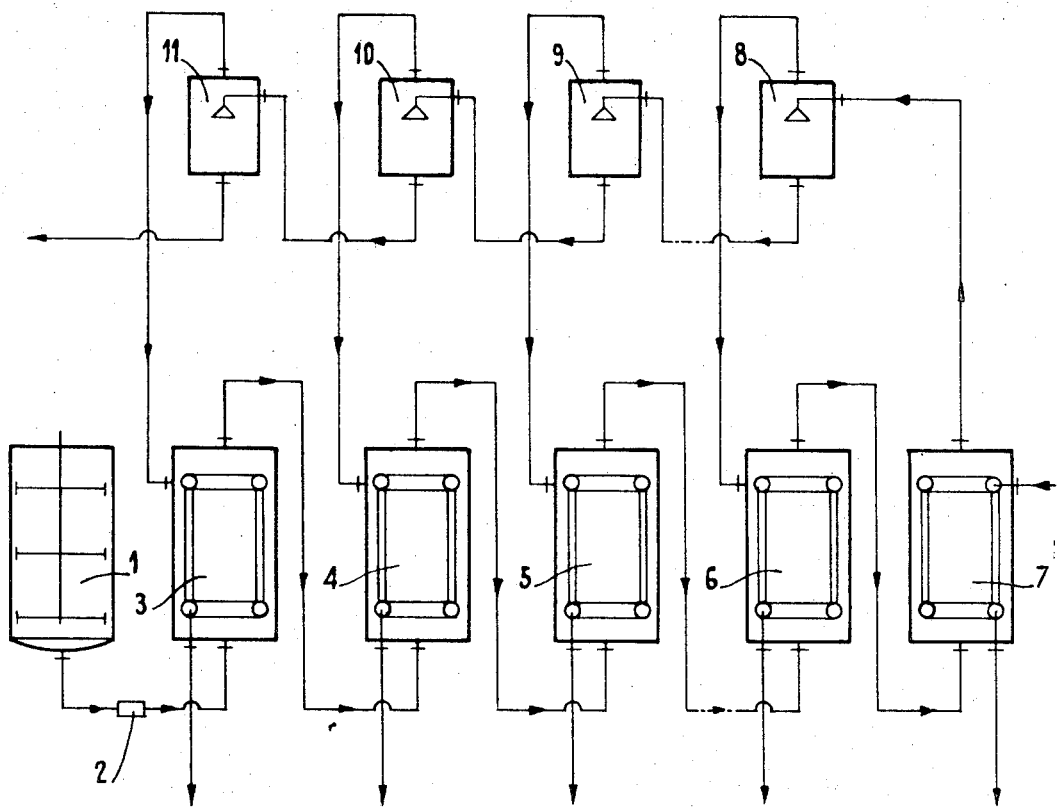
FIG. 1 is a flow diagram of the conventional practice prior to this invention.

The following is a description of present practice in the treatment of bauxite, as illustrated by the flow diagram in FIG. 1. The bauxite, after being crushed, is suspended in the required volume of caustic soda and sodium aluminate solution, which forms the attacking solution. A thick solution is formed and maintained with agitation in the storage tank 1 for delivery by pump 2 to a series of heater-type autoclaves 3, 4, 5 and 6 provided with heating means to effect increase in temperature of the suspension as it passes from one autoclave to the next until it reaches the last autoclave or autoclaves 7 which are heated with live steam. The suspension reaches its maximum temperature in the last autoclave and remains therein for the time necessary to complete the attack, i.e. the dissolution in the caustic soda of the alumina contained in the bauxite. An insoluble residue, known as "red muds" remains in suspension and is subsequently separated from the aluminate solution.

From the last autoclave, the suspension under high pressure and at high temperature passes into a series of expansion vessels 8, 9, 10 and 11 wherein an expansion is effected in each vessel with the accompanying partial vaporization of liquid. The vapor liberated in each expansion vessel is used for heating the autoclaves 6, 5, 4 and 3, referred to above.

Upon leaving the last expansion vessel 11, the suspension is diluted with water and sent to the installation for the separation of the red muds, as in settling tanks, clarifiers, filters or the like. After cooling, the separated clear liquor is advanced into decomposers where it is subjected to a hydrolysis to yield aluminum trihydrate and regenerate the caustic soda.

The described procedure is common to the existing installations for the continuous attack of bauxite with sodium aluminate and caustic solution. The most frequent modifications are concerned with:

(1) The temperatures and pressures which are used, which are increased without increase in difficulty of attack on the bauxite;

(2) The number of stages, which vary from installation to installation, depending upon the operational economy as between a high number of stages and the high invesement and maintenance costs thereof;

(3) The reheaters, which receive the vapor liberated in the expansion vessels, sometimes forming, with the autoclaves, a single apparatus formed of a nest of tubes enclosed within a resistant metal jacket.

Figure 2:
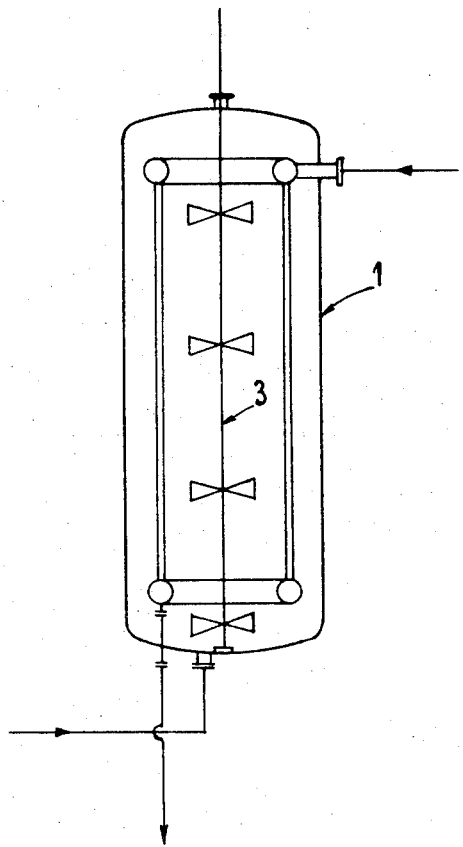
FIG. 2 is an elevational view of a reactor-heat exchanger.
Figure 3:
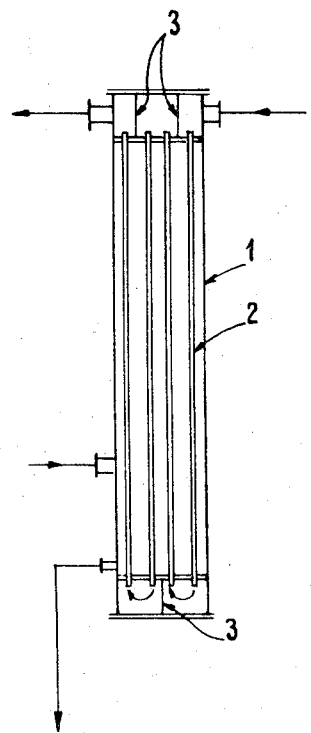
FIG. 3 is a side elevational view of the reactor-heat exchanger shown in FIG. 2.
Figure 4:
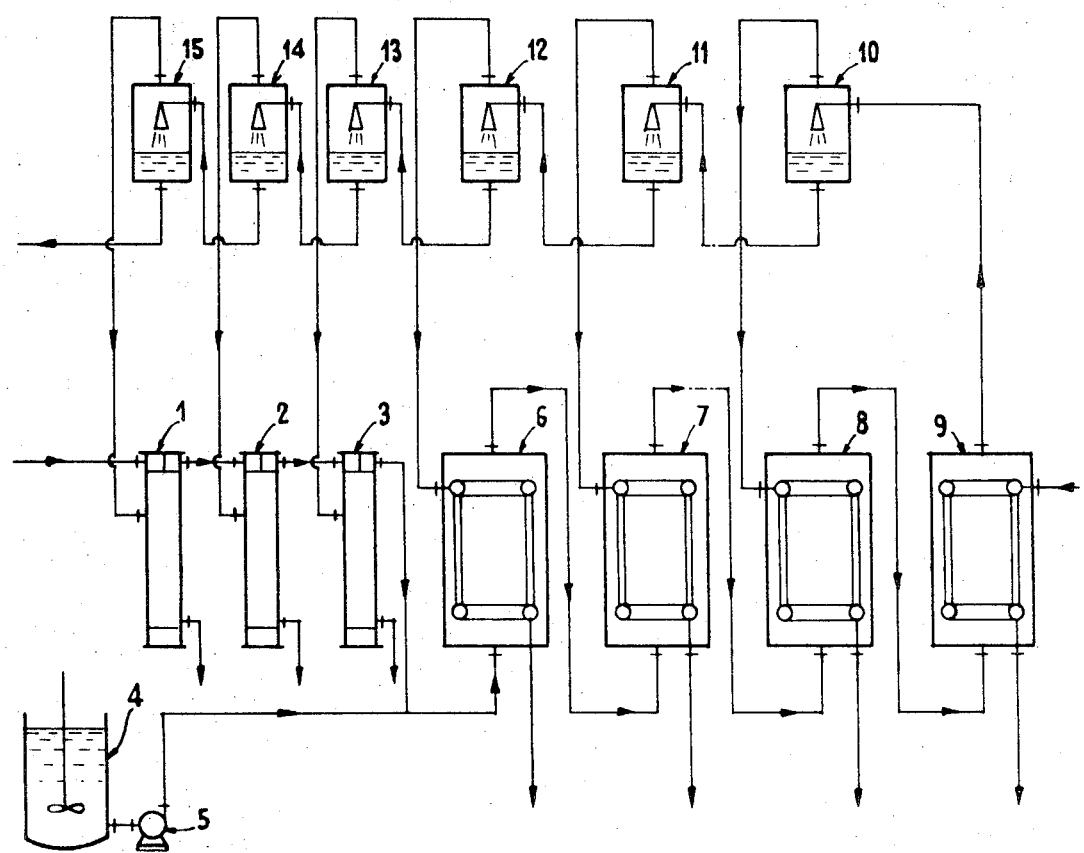
FIG. 4 is a flow diagram of the attacking process.

Generally, the vapor or steam is circulated through the nest of tubes while the bauxite suspension is circulated through the jacket which is usually provided with an agitation system, such a stirrers, to increase the heat exchange coefficient (FIG. 2). The converse arrangement can be adopted, as shown in FIG. 3, but generally this system is limited to apparatus for reheating the clear attacking solution before it is mixed with the bauxite (FIG. 4), because the dangers of clogging the tubes of the nest make this process difficult to employ with bauxite suspensions.

Heretofore the bauxite suspension which comes from one stage is reheated with steam in the following stage by direct heat exchange through the walls of the nest of tubes. This procedure has two main disadvantages, namely: a fairly small heat exchange coefficient which necessitates large heat exchange surfaces, and the deposit of encrusting salts on the exchange surfaces of the reheater. Actually, in each stage, a part of the alumina of the bauxite enters into solution in the alkali liquor with the simultaneous formation of insoluble salts composed mainly of silico-aluminates and titanates. These salts are partly formed on the hot walls of the heat exchanger to which they remain firmly adhered. As the thickness of the incrustations of salts increases, the heat exchange coefficient of the nest of tubes progressively decreases.

As a result, it becomes necessary periodically to clean the heating surfaces for removal of encrustations. This is a long tedious and costly operation and it requires a prolonged shutdown of the apparatus.

The process of this invention obviates these disadvantages by fundamentally modifying the heat exchange system between the expansion steam and the alkaline suspension.

Figure 5:
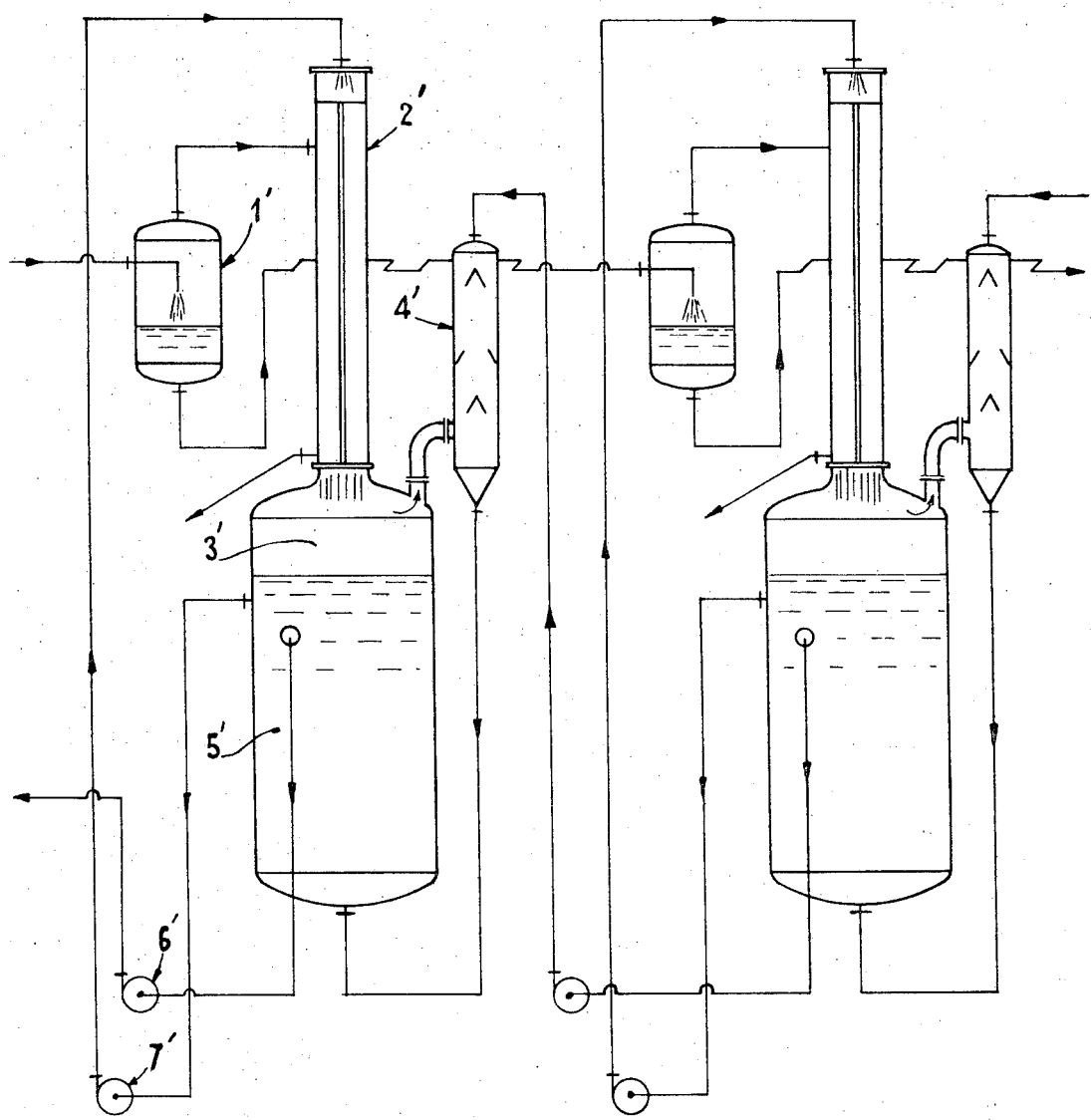
FIG. 5 is a flow diagram of a segment of the system representative of the practice of this invention.

In accordance with the process of this invention, the diagram of which is shown in FIG. 5, the heating of the suspension from a preceding stage is not effected by contact with the walls of the exchanger. Instead it is achieved by direct injection of steam coming from the said exchanger into a mixer type reheater 4'.

Thereafter, the suspension, reheated to its boiling point, is sent to reservoir 5' which may be equipped with an agitation system of any well known type. The suspension remains therein for an average time which is sufficient to achieve temperature equilibrium; for dissolution of the alumina and precipitation of the complex salts of silicon, titanium, etc. The time is usually less than one hour and preferably within the range of one to ten minutes. Since the suspension is no longer in contact with a wall at higher temperature than the suspension, precipitation of the salts occurs primarily within the solution as distinguished from on the walls of the exchanger.

As the operation is carried out in continuous fashion, a constant level 3' is maintained in the reservoir by means of a displacement pump 6' which transfers to the following stage a quantity of suspension equal to that which is derived from the preceding stage. In addition, a pump 7' simultaneously delivers into an exchanger 2' a certain quantity of the reheated liquor withdrawn from the reservoir 5'.

The exchanger 2' which receives expansion steam from the other side of the exchanger wall in direct heat exchange, when an intermediate stage is concerned, or live steam from the other side of said wall, when a final stage is concerned, is in fact an evaporator in which a part of the water is vaporized on the walls. Any type of exchanger-evaporator can be used, but it is preferred to employ a vertical exchanger-evaporator having a film of the aqueous medium flowing downwardly over the wall. The formed vapor entrains, at high speed, the liquid which trickles over the internal walls of the nest of tubes and is partially vaporized. In the mixer-type reheater 4', the vapor thus produced in exchanger 2' is brought into contact with the suspension coming from the preceding stage.

The unvaporized suspension in the evaporator 2' is returned to the reservoir 5'.

In practice, no encrustation is produced in the evaporator 2' since the insoluble salts have already precipitated within the reheated suspension remaining in the container 5'.

From a calorific point of view, such an assembly is equivalent to a conventional stage. However, by avoiding the direct contact between the suspension to be reheated and the heating nest of tubes, and by providing a chamber in which the reheated suspension is given time to reach its solubility equilibrium, formation of encrustations on the exchanger nest of tubes is almost completely avoided.

On the other hand, the heat transfer coefficient of an evaporator of the type which makes use of a film which flows downwardly over the heat exchange surface is very high. Coefficients of 2 to 3 thermal units per square meter per hour and per degree centigrade are obtained with such apparatus as compared to a coefficient which does not exceed 0.8 to - thermal unit with the existing reheaters.

The process of this invention permits another extremely important modification in the function of the apparatus. By injection of a supplementary quantity of steam into the evaporator 2', it is possible to achieve, in this apparatus, the production of a quantity of steam greater than that which is necessary for reheating the suspension originating from the preceding stage. By eliminating this excess steam, a concentration of the solution undergoing attack is obtained in the stage in question. The eliminated steam can be sent to the evaporator of the preceding stage as a supplementary charge. In this way, the entire apparatus has the effect of a multiple effect evaporator in which the concentration of the solutions is increased from one stage to the next.

The first injection is effected in the form of live steam introduced into one of the last stages and the corresponding quantity of steam is withdrawn from one of the first stages. This process, which can be applied to all or only part of the stages of the installation, cannot be carried out in existing installations. The increase in concentration of the caustic soda, which is achieved during the attacking operation, enables the efficiency of the operation to be greatly improved. The transformation of the alumina into aluminate is a balanced reaction which occurs at a more rapid rate and more completely as the concentration of the free caustic soda and the temperature are increased. In the absence of evaporation in the circuit, the concentration of caustic soda would decrease from one stage to the next. For this reason, the reaction which is rapid at the start becomes slow as the concentration of free caustic soda decreases, even when the temperature is raised. Because of the partial evaporation of the solution which is permitted by the process of this invention, the reaction rate is accelerated precisely in the zones where it otherwise would have a tendency to slow down.

The advantages of this process are numerous, namely:

Displacement of the equilibrium towards a more complete attack on the bauxite, as evidenced by higher yield; reduction of the reaction volume, which reflects in the size of equipment necessary for operation; reduction in the volume of outflowing liquors with corresponding reduction in heat losses from this outflow. By increasing the evaporation during the attack, it is possible completely to dispense with the separate evaporation plant that is usually employed in present practice for preparation of alumina; it is also possible to reduce the initial concentration of the alkaline liquors and to increase the concentration by evaporation during the action.

The flow diagram shown in FIG. 5 is capable of numerous modifications, namely: the two pumps 7' and 6' that are used to insure the circulation of the liquid in each of the two circuits can be replaced by a single pump adapted simultaneously to provide the two services.

Figure 6:
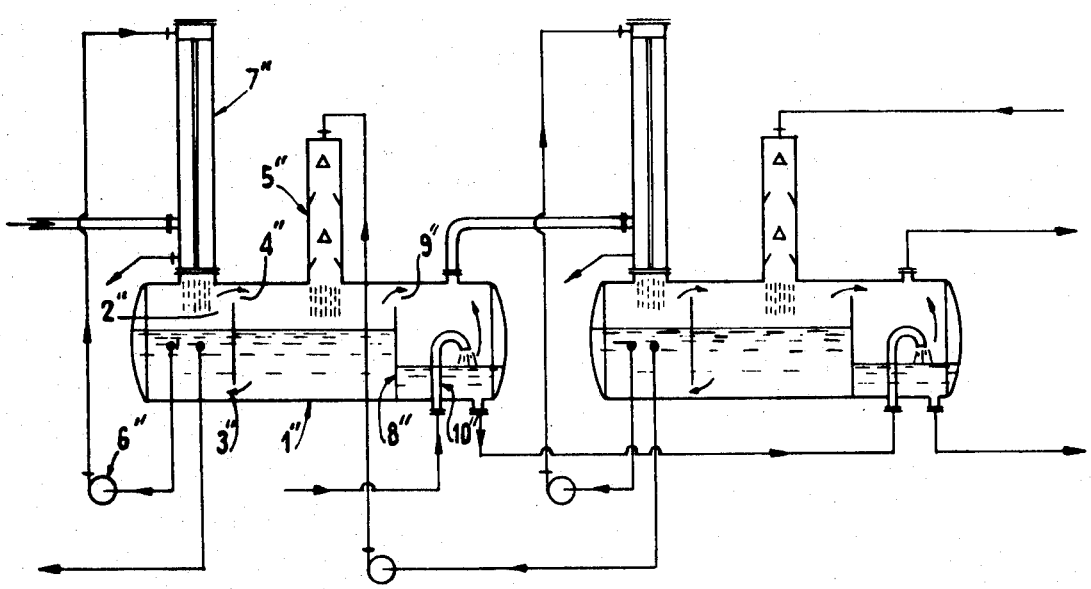
FIG. 6 is a flow diagram of a segment similar to that of FIG. 5 showing a modification in the practice of this invention.

An industrial installation embodying the same principle is described and shown in FIG. 6. The horizontal cylinder 1", in which the circulation of the liquid is braked by a vertical partition 2", has an opening at 3" for the passage of the liquid and another opening at 4" for the steam, forms the liquid reservoir with a volume sufficient for the equilibrium of the solution to be obtained before the suspension is passed by means of pump 6" to supply the evaporation nest of tubes 7", the heating of which is assured by the steam derived from the expansion separator of the following stage. The steam produced in the evaporator 7" is used for reheating the liquid coming from the following stage in the mixer-condenser 5".

The expansion separator itself is incorporated into the horizontal cylinder, the liquids being separated by the partition 8". This partition has an opening 9" at the upper end, by which the compartment thus formed is brought into pressure balance with the reservoir 1". This compartment has a device 10" suitable for the expansion of the liquid and for the separation of the steam produced.

This arrangement is advantageous because it simplifies the connecting pipe conduits and permits the operation of the assembly as a multiple effect evaporator.

It is possible for several successive stages to be combined in a single cylinder, which is divided internally by means of tight or sealed partitions, thereby providing still more simplification of the piping and reduction in heat loss.

On the other hand, the process of the invention is applicable when the clear solution of caustic soda and sodium aluminate is heated at the start of the attacking line and the bauxite is added to this solution by any appropriate means in one of the last stages of the line.

What is claimed is:

1. In a process for the continuous attack on ores containing alumina with aqueous solution of caustic soda and sodium aluminate wherein a suspension of ore in the aqueous solution is passed through a series of stages of autoclaves at increasing temperatures with the suspension entering the last stage being at a temperature close to its boiling point and wherein the suspension is passed through a series of stages of evaporative expansion zones of decreasing pressure, the improvement comprising the steps of heating the suspension entering each autoclave in a heating zone by direct fluid-fluid contact with steam, passing the resulting heated suspension into each autoclave wherein the suspension is in contact with the walls of the autoclave at a temperature no higher than the temperature of the suspension, the residence time of the suspension in the autoclave being sufficient to permit the suspension to reach thermal equilibrium whereby alumina from the ore is dissolved and complex salts in the ore are precipitated, removing a portion of suspension in each autoclave for passage to an evaporative expansion zone whereby the suspension passes through the evaporative expansion zone in the form of a thin film and is partially vaporized to form steam and returning the suspension not evaporated to each autoclave, passing the steam thus generated in each evaporative expansion zone to a heating zone in which the steam is contacted in fluid-fluid contact with the suspension fed to each autoclave from the preceding autoclave, and removing suspension from each autoclave for passage to the next stage at a rate corresponding to the rate at which suspension is delivered to each autoclave from the preceding autoclave.

2. The process as claimed in claim 1 in which the ore being treated is bauxite.

3. The process as claimed in claim 1 which the suspension is retained in the last autoclave for equilibrium for a time less than 1 hour.

4. The process as claimed in claim 1 in which the suspension is reained in the autoclave for a time within the range of 1 to 10 minutes.

5. The process as claimed in claim 1 in which the evaporator comprises a vertically disposed nest of tubes and the suspension is caused to flow downwardly gravitationally as a film over the wall of the tubes.

6. The process as claimed in claim 5 in which the generated steam entrains liquid on the internal walls of the tube.

7. The process as claimed in claim 1 which includes the step of introducing a quantity of live steam into one of the latter stages to evaporate a part of the water from the suspension entering the stage and charging the steam generated into the evaporator of the preceding stage.

8. The process as claimed in claim 1 in which the expansion zone of one stage is included as a part of a housing containing the autoclave and disposed along a horizontal axis and having partitions separating the liquid in the autoclave from the liquid in the expansion zone.

9. The process as claimed in claim 8 in which several successive stages are assembled in a single housing separated one from the other in sealed relation.

10. The process as claimed in claim 1 in which the first of the autoclaves receives only clear attacking solution with the ore being added to the solution in one of the latter stages.

References Cited

UNITED STATES PATENTS

| | | | |
|---|---|---|---|
| 2,701,751 | 2/1955 | Porter | 23—143 |
| 2,701,752 | 2/1955 | Porter | 23—143 |
| 2,852,343 | 9/1958 | Scandrett et al. | 23—143 |
| 2,946,658 | 7/1960 | Donaldson | 23—143 |
| 3,095,280 | 6/1963 | Soudan et al. | 23—143X |
| 3,241,910 | 3/1966 | Johnson | 23—52 |
| 3,413,087 | 11/1968 | Roberts | 23—143 |

HERBERT T. CARTER, Primary Examiner

U.S. Cl. X.R.

23—143, 267